United States Patent
Lin et al.

(10) Patent No.: US 7,599,325 B2
(45) Date of Patent: Oct. 6, 2009

(54) METHOD AND CIRCUIT FOR REDUCING POWER CONSUMPTION OF A WIRELESS LOCAL NETWORK

(75) Inventors: Chen-Jung Lin, Taipei (TW); Chun-Yi Wu, Taipei (TW); You-Hu Yen, Taipei (TW)

(73) Assignee: Via Technologies, Inc., Taipei (TW)

( * ) Notice: Subject to any disclaimer, the term of this patent is extended or adjusted under 35 U.S.C. 154(b) by 634 days.

(21) Appl. No.: 11/371,569

(22) Filed: Mar. 9, 2006

(65) Prior Publication Data

US 2007/0211655 A1    Sep. 13, 2007

(51) Int. Cl.
*G08C 17/00* (2006.01)
*H04W 4/00* (2009.01)
*H04M 1/00* (2006.01)

(52) U.S. Cl. .............. 370/328; 370/311; 455/550.1; 455/552.1; 455/574

(58) Field of Classification Search ............ 455/552.1, 455/553.1, 574, 550.1; 370/328, 311
See application file for complete search history.

(56) References Cited

U.S. PATENT DOCUMENTS 7,274,707 B2 *  9/2007  Choi et al. ............... 370/445
2004/0152418 A1 *  8/2004  Sinha et al. .................... 455/42
2005/0227728 A1 * 10/2005  Trachewsky et al. ....... 455/552.1
2005/0243860 A1 * 11/2005  Chen et al. ................... 370/465
2005/0250452 A1 * 11/2005  Walton et al. ............... 455/63.4

* cited by examiner

*Primary Examiner*—Vincent P Harper
*Assistant Examiner*—Marisol Figueroa
(74) *Attorney, Agent, or Firm*—Thomas, Kayden, Horstemeyer & Risley

(57) ABSTRACT

A method for reducing power consumption of a wireless local area network is provided. The wireless local area network comprises a first station communicating according to a first version communication standard, a second station communicating according to a second version communication standard, and an access point. The second station has a first baseband transceiver and a second baseband transceiver for respectively communicating packets according to the first and the second version communication standards. A communication mode of the second station, representing whether the second station communicates according to the first or the second version communication standards, is first stored. The second baseband transceiver is then disabled if the communication mode is the first version communication standard. A plurality of packets of the second station are then modulated or demodulated with the first baseband transceiver according to the first version communication standard.

18 Claims, 7 Drawing Sheets

METHOD AND CIRCUIT FOR REDUCING POWER CONSUMPTION OF A WIRELESS LOCAL NETWORK

BACKGROUND OF THE INVENTION

1. Field of the Invention

The present invention relates to wireless local network communication, and more particularly to an 802.11g wireless network.

2. Description of the Related Art

The conventional wireless LAN standard includes three physical layer standards: IEEE 802.11a, 802.11b, and 802.11g. The IEEE 802.11a standard adopts orthogonal frequency division multiplexing (OFDM) modulation to support a maximum data transfer rate of 54 Mbps. The IEEE 802.11b standard adopts the direct sequence spread spectrum (DSSS) technique and complementary code keying (CCK) modulation to support a maximum data transfer rate of 11 Mbps. Because IEEE 802.11a and IEEE 802.11b devices cannot work together in a single wireless network, the IEEE 802.11g standard is provided to accommodate both the higher data rate OFDM modulation and the lower data rate DSSS modulation. Thus, although an 802.11g device can support a high data rate, it can still communicate with an 802.11b device, and an 802.11g network can comprise both 802.11b devices and 802.11g devices at the same time.

An 802.11g access point is the core of an 802.11g network. All other devices in the wireless network connect to the external network or a backbone network through the 802.11g access point. When an 802.11g wireless network contains both 802.11b devices and 802.11g devices, the 802.11g devices can understand DSSS signals emitted from 802.11b devices, and will wait until the DSSS signal ends to communicate with the access point. 802.11b devices, however, do not understand OFDM signals emitted from 802.11g devices, and will treat the OFDM signal as noises. If an 802.11b device attempts to communicate with the access point while an 802.11g device is transmitting OFDM signals, the 802.11b device will not wait to emit a DSSS signal and will interfere with the OFDM signals of the 802.11g device. Thus, the access point or the 802.11g devices must notify the 802.11b devices to suppress their communication before the access point of the 802.11g devices emit OFDM signals.

FIG. 1 shows the down link procedures initiated by an access point 102 in an 802.11g network 100. The 802.11g network 100 includes three elements: an 802.11g access point 102, an 802.11g station 104, and an 802.11b station 106. When the access point 102 wants to initiate communication with the 802.11g station 104, it must send a 802.11b request to send (RTS) command 112 modulated with the DSSS and CCK method to the 802.11b station 106. After receiving the RTS command 112, the 802.11b station 106 will return a 802.11b clear to send (CTS) command 114 to the access point 102, indicating that the 802.11b station 106 will not emit DSSS signal for a period of time requested by the RTS command 112. The access point 102 then issues an 802.11g RTS command 116 to the 802.11g station 104. After receiving the RTS command 116, the 802.11g station then returns a 802.11g CTS command 118 to the access point 102, indicating that the 802.11g station 104 is ready to receive signals from the access point 102. The access point 102 then begins sending OFDM signals to the 802.11g station 104 for transferring data.

FIG. 2 shows the up link procedures initiated by the 802.11g station 104 in the 802.11g network 100. When the 802.11g station 104 wants to initiate communication with the access point 102, it must send an 802.11b CTS to self command 212 modulated with the DSSS/CCK method to the 802.11b station 106 to request that the 802.11b station 106 not emit DSSS signals for a period. The 802.11g station 104 then issues an 802.11g RTS command 214 to the access point 102. After receiving the RTS command 214, the access point 102 then return a 802.11g CTS command 216 to the 802.11g station 104, indicating that the access point 102 is ready to receive signals from the 802.11g station 104. The 802.11g station 104 then begins sending OFDM signals to the access point 102 for transferring data.

Transmitting RTS, CTS, and CTS to self commands, however, requires additional bandwidth, reducing the bandwidth efficiency of the wireless network 100. In addition, some applications do not require bandwidth as high as 54 Mbps to support communication. For example, a VOIP call only requires 2 Mbps of bandwidth to support the voice packet traffic. If the access point and the 802.11g station use the OFDM modulation method to support the VOIP application, both the bandwidth and the power of the 802.11g station will be wasted. If the 802.11g station is a handheld device, the battery power is limited and the 802.11g station will only operate for a certain amount of time. Moreover, although the data rate of OFDM modulation is higher than the data rate of DSSS modulation, but, DSSS modulation has a wider transmission range than OFDM modulation. Thus, OFDM modulation technique still has deficiencies in an 802.11g network.

BRIEF SUMMARY OF THE INVENTION

The invention provides a method for reducing power consumption of a wireless local area network. There are a first and a second version communication standards suitable for the wireless local area network. The wireless local area network comprises a first station and a second station respectively communicating according to the first and the second version communication standard and an access point. The second station has a first and a second baseband transceiver for respectively communicating packets according to the first and the second version communication standards.

The method comprising the steps of: storing a communication mode of the second station, wherein the communication mode represents whether the second station communicates according to the first or the second version communication standards; disabling the second baseband transceiver of the second station if the communication mode is the first version communication standard; modulating a plurality of first packets of the second station with the first baseband transceiver according to the first version communication standard before the plurality of first packets is delivered by the second station; and demodulating a plurality of second packets of the second station with the first baseband transceiver according to the first version communication standard after the plurality of second packets is received by the second station.

The invention also provides a wireless communication station wirelessly coupled to an access point of a wireless local area network. There are a first and a second version communication standards suitable for the wireless local area network. The wireless local area network includes a first station communicating according to the first version communication standard. The wireless communication station comprises a first baseband transceiver for communicating packets of the wireless communication station according to the first version communication standard, a second baseband transceiver for communicating packets of the wireless communication station according to the second version communication standard, and a control module coupled to the first and second baseband transceivers for storing a communication mode representing whether the wireless communication station communicates according to the first or the second version communication standards, disabling the second baseband transceiver of the wireless communication station if the communication mode is the first version communication standard, controlling the first baseband transceiver to modulate a plurality of first packets according to the first version communication standard before the plurality of first packets is delivered, and controlling the first baseband transceiver to demodulate a plurality of second packets according to the first version communication standard after the plurality of second packets is received.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
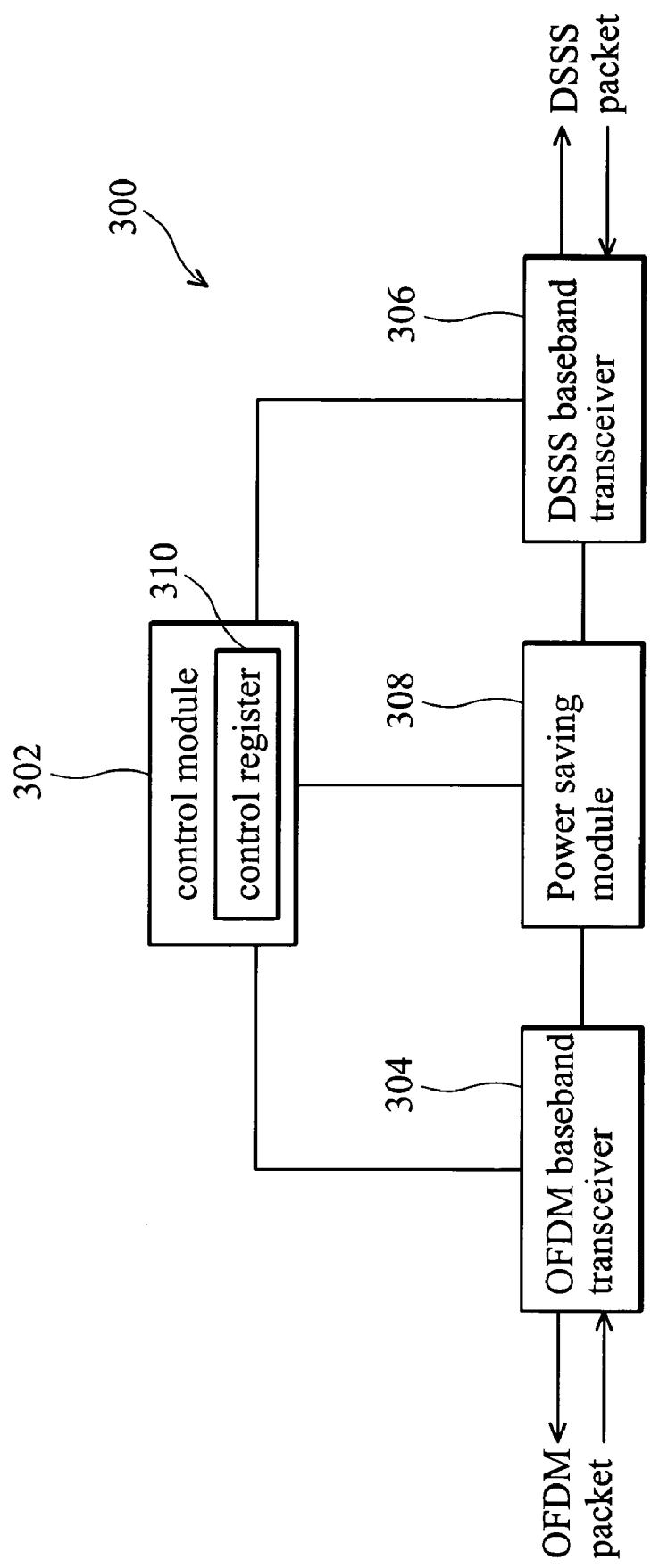
FIG. 3 shows a block diagram of an 802.11g device according to the invention.

FIG. 3 shows a block diagram of an 802.11g device 300 according to the invention. The 802.11g device 300 can be an 802.11g station or an 802.11g access point. The 802.11g device 300 includes a control module 302, an OFDM baseband transceiver 304, a DSSS baseband transceiver 306, and a power saving module 308. The OFDM baseband transceiver 304 handles the enhanced rate physical—orthogonal frequency division multiplexing (ERP-OFDM) physical layer communication. The DSSS baseband transceiver 306 handles the enhanced rate physical—direct sequence spread spectrum/complementary code keying (ERP-DSSS/CCK) physical layer communication. The control module 302 controls the operation of the OFDM baseband transceiver 304 and the DSSS baseband transceiver 306. The control module 302 includes a control register 310 which stores a communication mode of the 802.11g device inside. The power saving module 308 serves to reduce power consumption of the 802.11g device 300, and will be described in detail with FIG. 4.

Ordinary 802.11g devices can transmit or receive signals modulated in the OFDM method through the OFDM transceiver module 304, or transmit or receive signals modulated in DSSS/CCK method through the DSSS transceiver module 306. The invention, however, provides a programmable option for the 802.11g device 300 to function normally as an ordinary 802.11g device or emulate an 802.11b device. The programmable option is named as the communication mode of the 802.11g device 300 and stored in the control register 310. When emulating an 802.11b device, the 802.11g device communicates via 802.11b protocol, and the communication data is modulated with the DSSS/CCK method and can be demodulated by other 802.11b devices.

Figure 4:
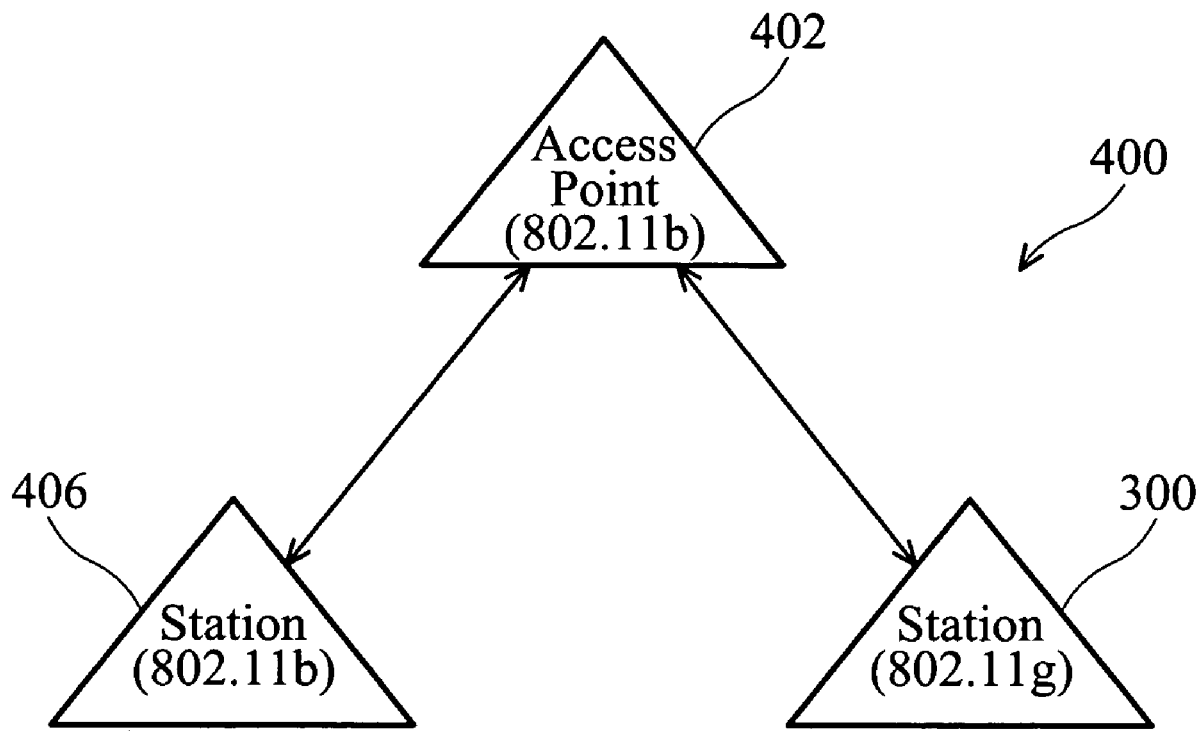
FIG. 4 shows a wireless local area network which includes a 802.11b access point according to the invention.
Figure 5A:
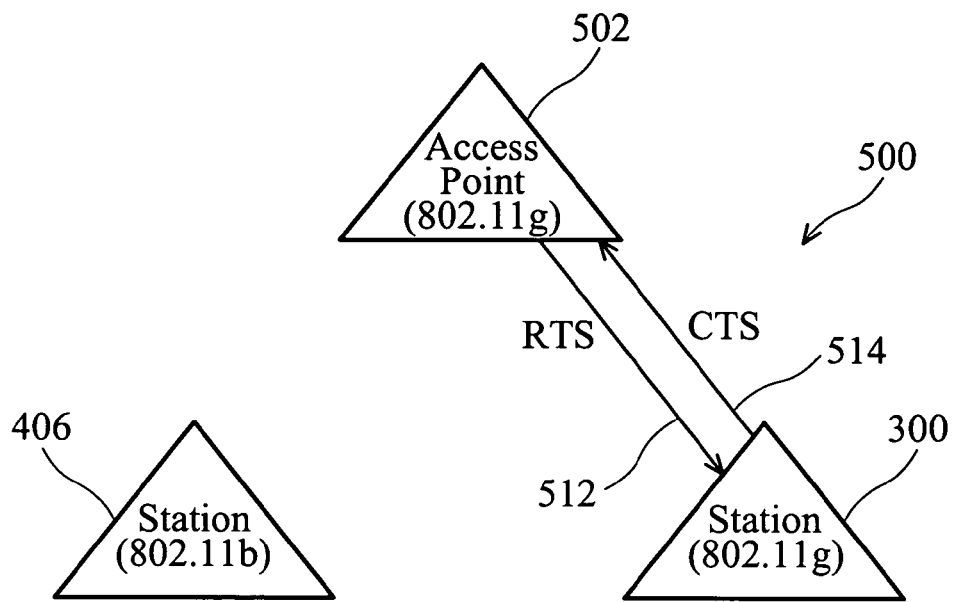
FIG. 5a shows the down link procedures initiated by an 802.11g access point according to the invention.
Figure 5B:
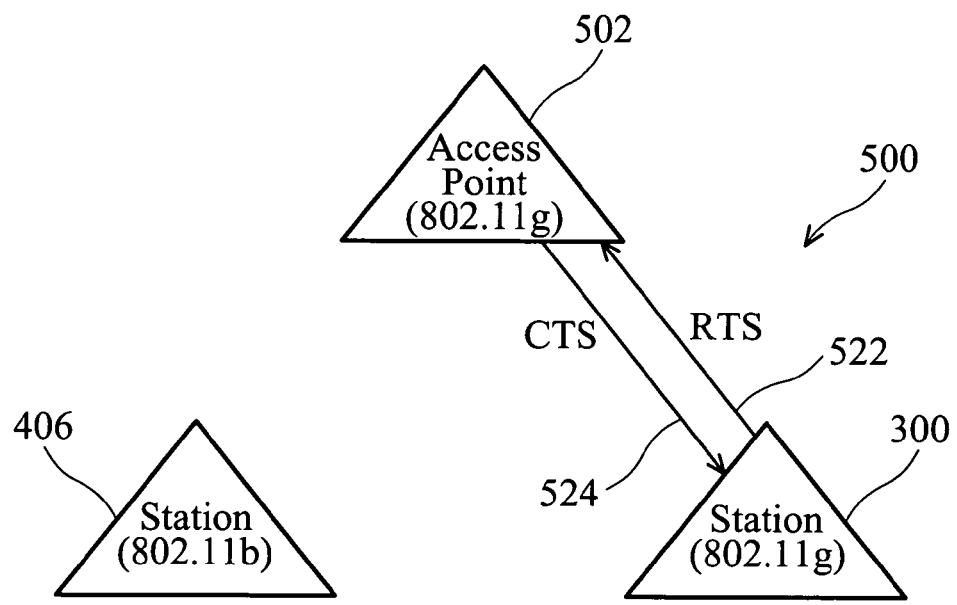
FIG. 5b shows the up link procedures initiated by an 802.11g station to an 802.11g access point according to the invention.

FIG. 4 shows a wireless local area network 400. The wireless local area network 400 includes an 802.11b access point 402, an 802.11b station 406, and a 802.11g station 300 of FIG. 3. Because the 802.11g station 300 can be configured to emulate a 802.11b station, it can communicate with the 802.11b access point 402 and connect to the backbone network through the 802.11b access point. Additionally, the OFDM baseband transceiver 304 of the 802.11g station 300 is disabled to reduce power consumption FIG. 5a and FIG. 5b show a wireless local area network 500. The wireless local area network 500 includes an 802.11g access point 502, an 802.11b station 406, and a 802.11g station 300 of FIG. 3. Because the 802.11g station 300 can be configured to emulate a 802.11b station, when the 802.11g station 300 communicates with the 802.11g access point 502 via 802.11b protocol, the 802.11b station 406 can interpret the 802.11b signals. Thus, when the 802.11g station 300 communicates with the access point 502, no RTS, CTS, or CTS to self command is necessary to be sent to 802.11b station 406 before communicating, and the bandwidth of the wireless network 500 can be used more efficiently.

Figure 1:
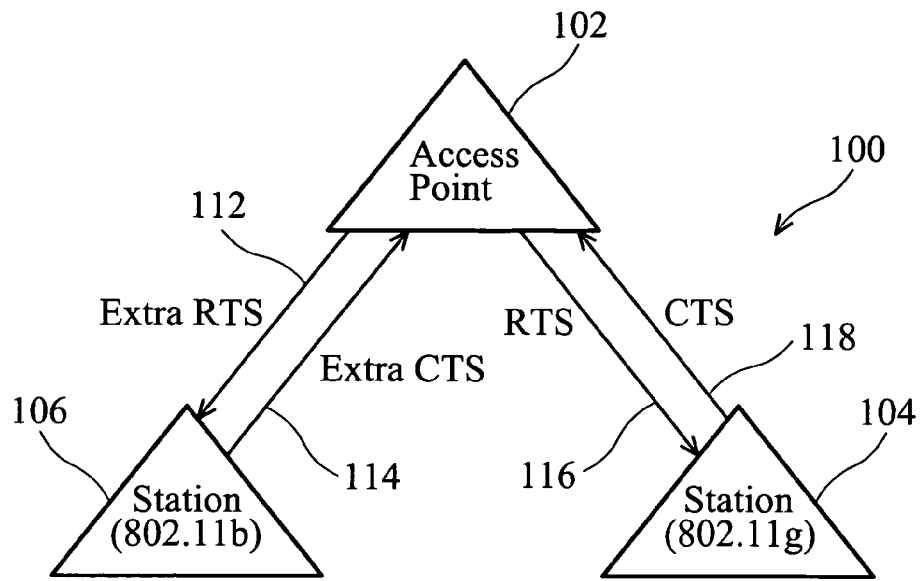
FIG. 1 shows the down link procedures initiated by an access point in an 802.11g network.

FIG. 5a shows the down link procedures initiated by an 802.11g access point 502 according to the invention. FIG. 5a is a contrast to the down link procedure shown in FIG. 1. When the access point 502 hopes to initiate a downlink to the 802.11g station 300, it directly issues an 802.11b RTS command 512 to the 802.11g station 300 without sending RTS command 112 of FIG. 1. After receiving the RTS command 116, the 802.11g station 300 then returns a 802.11b CTS command 514 to the access point 502, indicating that the 802.11g station 300 is ready to receive signals from the access point 502. The access point 502 then begins sending signals to the 802.11g station 300 for transferring data. As shown by FIG. 5a, the RTS command 112 and CTS command 114 of FIG. 1 are omitted to save bandwidth of the wireless local area network 500.

Figure 2:
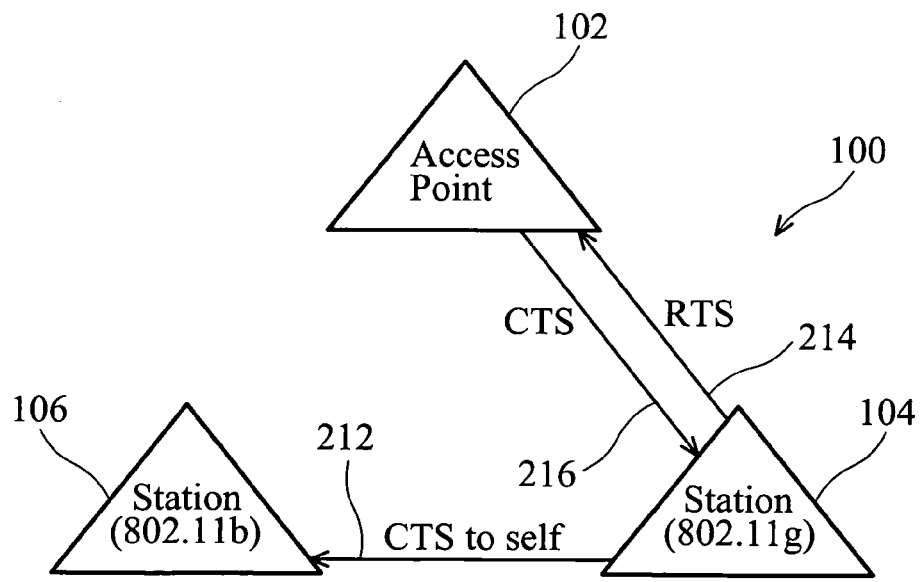
FIG. 2 shows the up link procedures initiated by an 802.11g station in an 802.11g network.

FIG. 5b shows the up link procedures initiated by an 802.11g station 300 to an 802.11g access point 502 according to the invention. FIG. 5b is a contrast to the up link procedure shown in FIG. 2. When the 802.11g station 300 hopes to initiate a downlink to the access point 502, it directly issues an 802.11b RTS command 522 to the access point 502 without sending CTS to self command 212 of FIG. 2. After receiving the RTS command 522, the access point 502 then return a 802.11b CTS command 524 to the 802.11g station 300, indicating that the access point 502 is ready to receive signals from the 802.11g station 300. The 802.11g station 300 then begins sending signals to the access point 502 for transferring data. As shown by FIG. 5b, the CTS to self command 212 of FIG. 2 is omitted to save bandwidth of the wireless local area network 500.

Figure 5C:
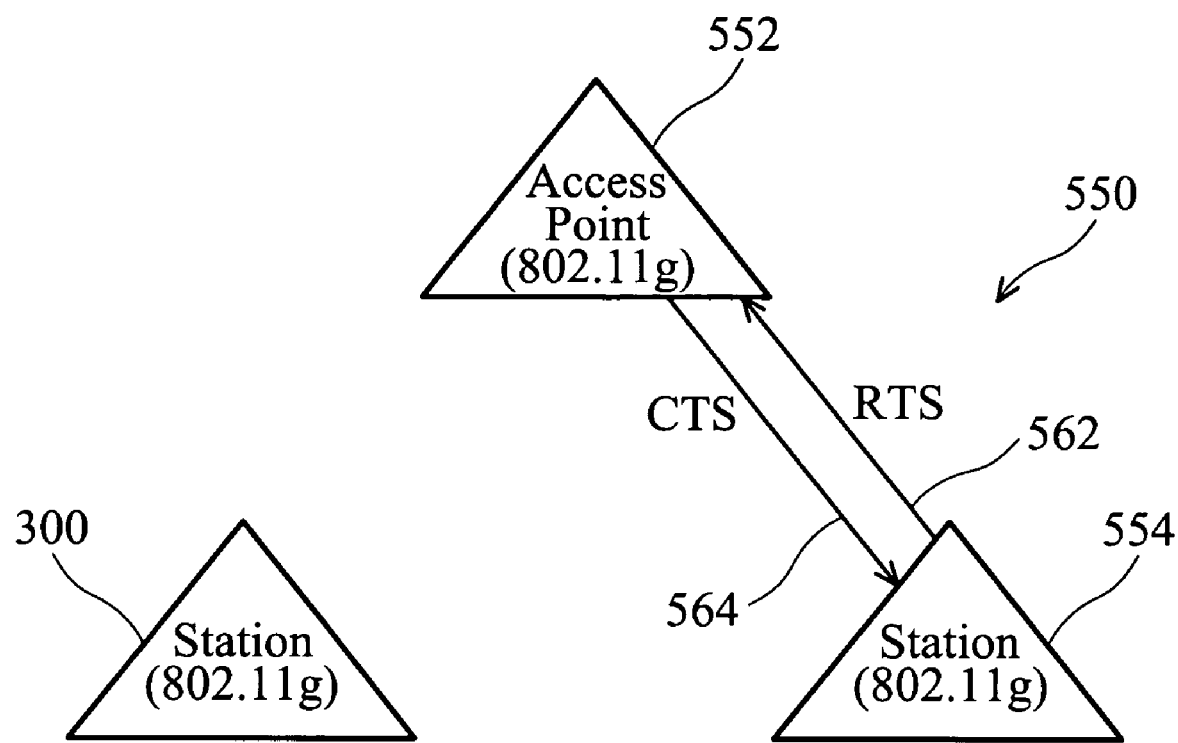
FIG. 5c shows another up link procedures initiated by an 802.11g station to an 802.11g access point according to the invention.

FIG. 5c shows a wireless local area network 550. The wireless local area network 550 includes an 802.11g access point 502, an ordinary 802.11g station 554, and a 802.11g station 300 of FIG. 3. Because the 802.11g station 300 can understand OFDM signals of an ordinary 802.11g station 554, when the 802.11g station 554 communicates with the 802.11g access point 552 via 802.11g protocol, the 802.11g station 300 can interpret the 802.11g signals. Thus, when the ordinary 802.11g station 554 communicates with the access point 552, no RTS, CTS, or CTS to self command is necessary to be sent to 802.11g station 300 of the invention before communicating. FIG. 5c shows an up link procedures initiated by an ordinary 802.11g station 554 to an 802.11g access point 552 according to the invention. The ordinary 802.11g station 554 directly issues an 802.11g RTS command 526 to the access point 552 without sending CTS to self command 212 of FIG. 2, and the access point 552 then return a 802.11g CTS command 564 to the ordinary 802.11g station 554. The ordinary 802.11g station 554 then begins sending signals to the access point 552 for transferring data. As shown by FIG. 5c, the CTS to self command 212 of FIG. 2 is omitted to save bandwidth of the wireless local area network 550.

Figure 6:
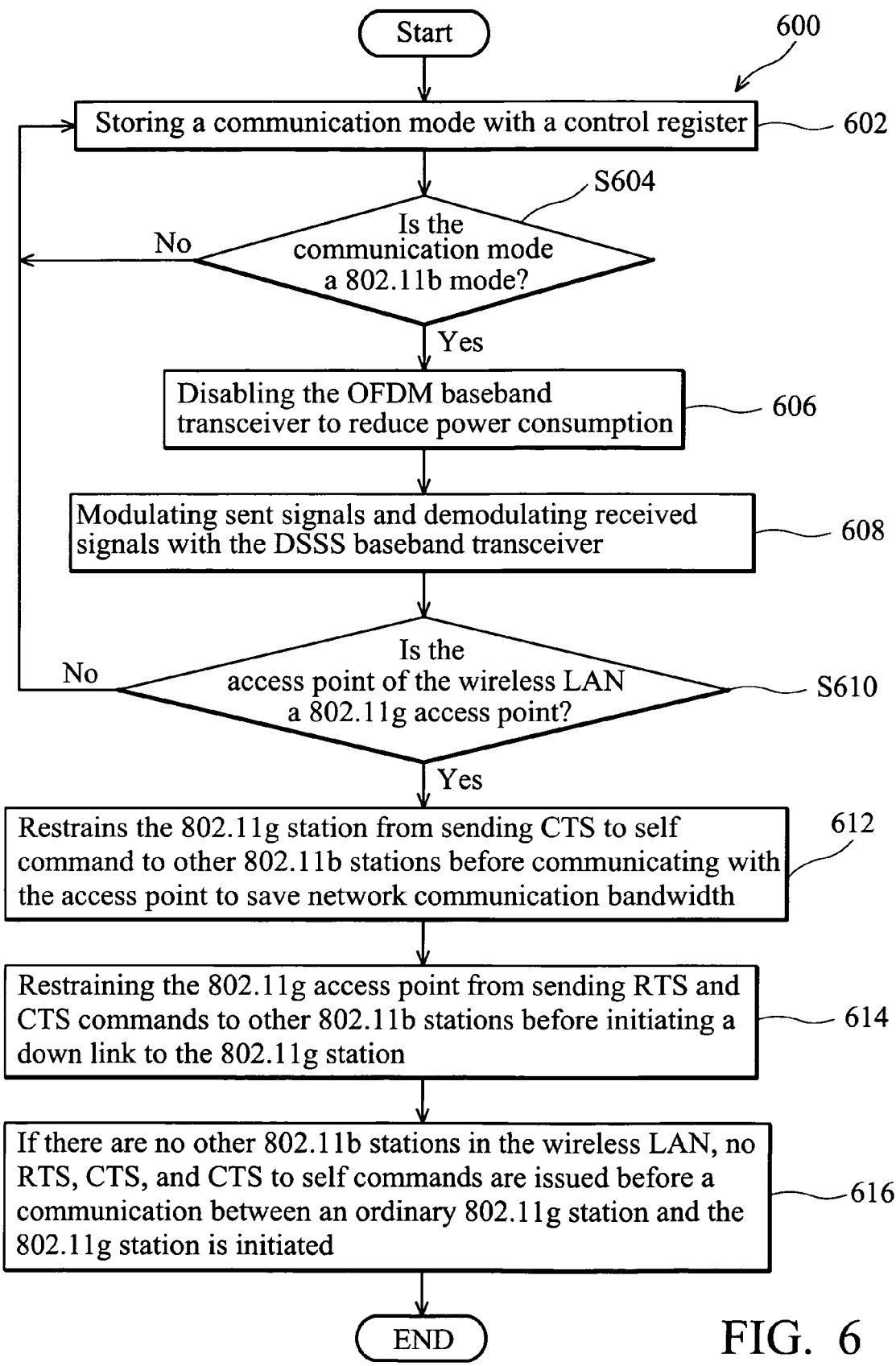
FIG. 6 shows a flowchart of a method for implementing the backward compatibility of a wireless LAN device according to the invention.

FIG. 6 shows a flowchart of a method for implementing the backward compatibility of a wireless LAN device according to the invention. The wireless LAN device may be the 802.11g station 300. There are more than one version of wireless LAN communication standard for the wireless LAN device, such as the 802.11g and 802.11b standard. The wireless LAN device has two transceivers for modulating and demodulating the signals according to the two versions of communication standard, such as the OFDM baseband transceiver 304 and the DSSS baseband transceiver 306. The method 600 is illustrated with the 802.11g station 300 of the invention.

The control module 302 first stores whether the communication mode is 802.11g mode or 802.11b mode with a control register 310 (step 602). If the communication mode is the 802.11b mode, the control module 302 then disables the OFDM baseband transceiver 304 to reduce power consumption of the 802.11g station 300 (step 606). The sent packets are then modulated with the DSSS baseband transceiver 306, and the received packets are demodulated with the DSSS baseband transceiver 366 (step 608). The control module 302 uses the DSSS baseband transceiver 306 to modulate all communicated data with the DSSS/CCK method. If the access point of the wireless LAN is an 802.11g access point, the control module 302 then restrains the 802.11g station 300 from sending CTS to self command to other 802.11b stations before communicating with the access point (step 612), as shown in FIG. 5b. Additionally, the 802.11g access point of the wireless LAN is also restrained from sending RTS and CTS commands to other 802.11b stations before initiating a down link to the 802.11g station 300 (step 614), as shown in FIG. 5a. If there are no other 802.11b stations in the wireless LAN, no RTS, CTS, and CTS to self commands are issued before a communication between an ordinary 802.11g station and the 802.11g station is initiated (step 616), as shown in FIG. 5c. Thus, the communication bandwidth of the network is saved.

Assume there is an 802.11g wireless network which comprises a plurality of 802.11b stations, a plurality of 802.11g stations, and an 802.11g access point. If the control module 302 is installed in both the plurality of 802.11g stations and the 802.11g access point, a network administrator of the 802.11g wireless network can then determine whether to enable the function to make the plurality of 802.11g stations and the 802.11g access point communicate via 802.11b protocol. Because the communicated data can be demodulated by other 802.11b devices of the 802.11g wireless network under this situation, the plurality of 802.11g stations and the 802.11g access point do not need to send RTS, CTS or CTS to self commands before communicating, original bandwidth used to transmit these commands can be saved to improve the bandwidth efficiency of the wireless network. Additionally, because DSSS modulation has wider transmission range than OFDM modulation, the coverage range of the 802.11g wireless network can be broadened.

Figure 7:
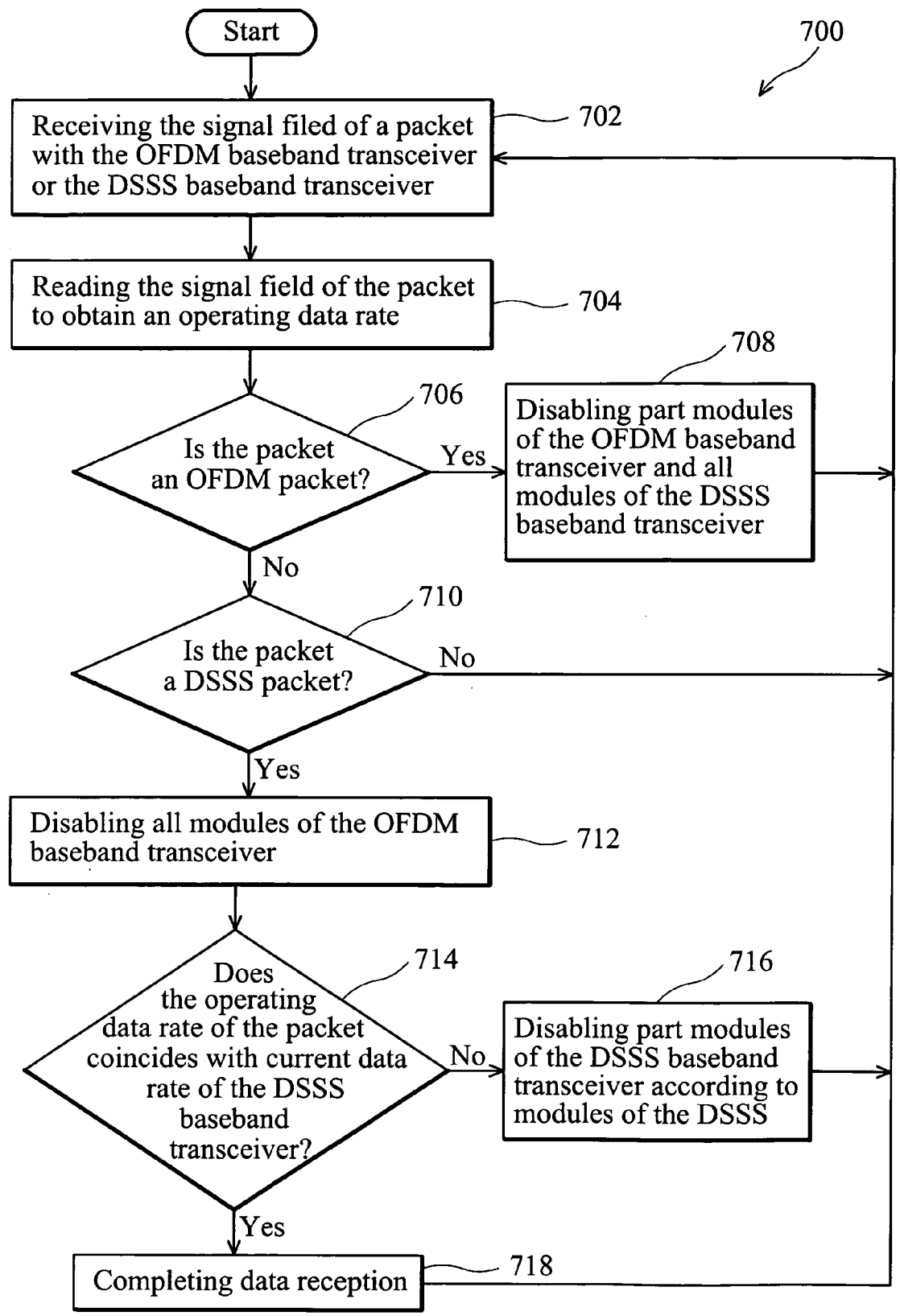
FIG. 7 shows a flowchart of the method for reducing power consumption of an wireless local area network device according to the invention.

FIG. 7 shows a flowchart of a method 700 for reducing power consumption of an wireless local area network device according to the invention. Method 700 can be implemented by the power saving module 308 to automatically save power of the 802.11g device 300. Method 700 starts with step 702 to receive the signal field of a packet with the OFDM baseband transceiver 304 or the DSSS baseband transceiver 306. The signal field of the packet is then read to obtain an operating data rate in step 704. Although only the signal field of the packet is received, the modulation pattern of the packet can be determined with the OFDM baseband transceiver 304 and the DSSS baseband transceiver. If the packet is an OFDM packet in step 706, some modules of the OFDM baseband transceiver 304 and all modules of the DSSS baseband transceiver 306 are disabled by the power saving module 308 in step 708 for reducing power consumption. Otherwise, if the packet is a DSSS packet in step 710, all modules of the OFDM baseband transceiver 304 are disabled by the power saving module 308 in step 712 for reducing power consumption.

The power saving module 308 then checks whether the operating data rate of the packet coincides with the current data rate of the DSSS baseband transceiver 306 in step 714. If so, the DSSS baseband transceiver 306 can complete data reception of the packet in step 718. Otherwise, some modules of the DSSS baseband transceiver 306 are disabled by the power saving module 308 according to the operating data rate in step 716. The DSSS baseband transceiver 306 includes a plurality of transmit and receive modules, each corresponding to specific data rates. For example, current 802.11g DSSS signals have four data rates: 1 Mbps, 2 Mbps, 5.5 Mbps, and 11 Mbps, and each data rate corresponds to one transmit and receive module of the DSSS baseband transceiver 306. When the DSSS baseband transceiver 306 demodulate a packet with 5.5 Mbps data rate, the DSSS baseband transceiver 306 may only use the transmit and receive modules corresponding to 1 Mbps, 2 Mbps, and 5.5 Mbps. When this occurs, the transmit and receive modules corresponding to 11 Mbps are idle and consuming power. Thus, the modules corresponding to data rates higher than the operating data rate among the plurality of transmit and receive modules are disabled by the power saving module 308 in step 716.

In this disclosure, a method for improving network performance of an 802.11g wireless network which contains both 802.11b devices and 802.11g devices is provided. A control module is installed on the 802.11g devices for controlling the 802.11g station to communicate via 802.11b protocol through the DSSS baseband transceiver without sending an RTS command, a CTS command, or a CTS to self command before communicating. A power saving module is installed on the 802.11g devices for reducing power consumption. Thus, the bandwidth used to transmit the RTS/CTS commands is reduced to improve bandwidth efficiency of the wireless network, the operating range of the wireless network is broadened, the power consumption of each 802.11g device is reduced, and the overall network performance of the wireless network is improved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reducing power consumption of a wireless local area network, wherein there are an IEEE 802.11b and an IEEE 802.11g standards suitable for the wireless local area network, the wireless local area network comprises a 802.11b station communicating according to the IEEE 802.11b standard, a 802.11g station communicating according to the IEEE 802.11g standard, and an access point, and the 802.11g station has a DSSS baseband transceiver and an OFDM baseband transceiver for respectively communicating packets according to the IEEE 802.11b and the IEEE 802.11g standards, the method comprising the steps of:
   storing a communication mode of the 802.11g station, wherein the communication mode represents whether the 802.11g station communicates according to the IEEE 802.11b or the IEEE 802.11g standards;
   disabling the OFDM baseband transceiver of the 802.11g station if the communication mode is the IEEE 802.11b standard;
   modulating a plurality of first packets of the 802.11g station with the DSSS baseband transceiver according to the IEEE 802.11b standard before the plurality of first packets is delivered by the 802.11g station;
   demodulating a plurality of second packets of the 802.11g station with the DSSS baseband transceiver according to the IEEE 802.11b standard after the plurality of second packets is received by the 802.11g station; and
   restraining the 802.11g station from sending a CTS to self command to the 802.11b station before communicating with the access point to save network communication bandwidth if the access point is an 802.11g access point.

2. The method as claimed in claim 1, further comprising:
   restraining the access point from sending a request to send (RTS) command to the 802.11b station before communicating with the 802.11g station to save network communication bandwidth if the access point is an 802.11g access point.

3. The method as claimed in claim 1, wherein the plurality of first packets are modulated by the 802.11g station with the DSSS baseband transceiver according to a direct sequence spread spectrum (DSSS) technique in the modulating step, and the plurality of second packets are demodulated by the 802.11g station with the DSSS baseband transceiver according to the DSSS technique in the demodulating step.

4. The method as claimed in claim 1, wherein the method further comprises the step of:
   disabling some modules of the OFDM baseband transceiver and all modules of the DSSS baseband transceiver of the 802.11g station for saving power if a third packet received by the 802.11g station is an OFDM packet.

5. The method as claimed in claim 1, wherein the method further comprises the step of:
   disabling all modules of the OFDM baseband transceiver of the 802.11g station for saving power if a third packet received by the 802.11g station is a DSSS/CCK packet.

6. The method as claimed in claim 1, wherein the method further comprises the steps of:
   reading a signal field of a third packet received by the 802.11g station to obtain an operating data rate of the third packet; and
   disabling some modules of the DSSS baseband transceiver of the 802.11g station for reducing power consumption according to the operating data rate if the third packet is a DSSS/CCK packet.

7. The method as claimed in claim 6, wherein the DSSS baseband transceiver includes a plurality of transmit and receive modules corresponding to different data rate, and the disabling step disables the modules corresponding to data rates higher than the operating data rate among the plurality of transmit and receive modules.

8. The method as claimed in claim 6, wherein the method further comprises the step of:
   disabling some modules of the OFDM baseband transceiver of the 802.11g station for reducing power consumption according to the operating data rate if the third packet is an OFDM packet.

9. A 802.11g station, wirelessly coupled to an access point of a wireless local area network, wherein there are an IEEE 802.11b and an IEEE 802.11g standards suitable for the wireless local area network, and the wireless local area network includes a 802.11b station communicating according to the IEEE 802.11b standard, the 802.11g station comprising:
   a DSSS baseband transceiver, for communicating packets of the 802.11g station according to the IEEE 802.11b standard;
   an OFDM baseband transceiver, for communicating packets of the 802.11g station according to the IEEE 802.11g standard; and
   a control module, coupled to the DSSS and OFDM baseband transceivers, for storing a communication mode representing whether the 802.11g station communicates according to the IEEE 802.11b or the IEEE 802.11g standards, disabling the OFDM baseband transceiver of the 802.11g station if the communication mode is the IEEE 802.11b standard, controlling the DSSS baseband transceiver to modulate a plurality of first packets according to the IEEE 802.11b standard before the plurality of first packets is delivered, controlling the DSSS baseband transceiver to demodulate a plurality of second packets according to the IEEE 802.11b standard after the plurality of second packets is received, and restrains the 802.11g station from sending a CTS to self command to the 802.11b station before communicating with the access point to save network communication bandwidth if the access point is an 802.11g access point.

10. The wireless communication station as claimed in claim 9, wherein the access point is restrained from sending a request to send (RTS) command to the 802.11b station before communicating with the 802.11g station to save network communication bandwidth if the access point is an 802.11g access point.

11. The 802.11g station as claimed in claim 9, wherein the plurality of first packets are modulated by the 802.11g station with the DSSS baseband transceiver according to a direct sequence spread spectrum (DSSS) technique, and the plurality of second packets are demodulated by the 802.11g station with the DSSS baseband transceiver according to the DSSS technique.

12. The 802.11g station as claimed in claim 9, wherein the wireless communication station further comprises:
   a power saving module, coupled to the OFDM baseband transceiver and the DSSS baseband transceiver, for disabling modules of the OFDM baseband transceiver or modules of the DSSS baseband transceiver for saving power according to whether a third packet received by the 802.11g station is an OFDM packet or a DSSS/CCK packet.

13. The 802.11g station as claimed in claim 12, wherein some modules of the OFDM baseband transceiver and all modules of the DSSS baseband transceiver are disabled by the power saving module if the third packet received by the wireless communication station is an OFDM packet.

14. The 802.11g station as claimed in claim 12, wherein all modules of the OFDM baseband transceiver of the 802.11g station are disabled by the power saving module if the packet received by the 802.11g station is a DSSS/CCK packet.

15. The 802.11g station as claimed in claim 12, wherein a signal field of the packet is read by the DSSS baseband transceiver to obtain an operating data rate of the packet if the packet is a DSSS/CCK packet, and some modules of the DSSS baseband transceiver are then disabled by the power saving module according to the operating data rate.

16. The 802.11g station as claimed in claim 15, wherein the DSSS baseband transceiver includes a plurality of transmit and receive modules corresponding to different data rates, and the some modules corresponding to data rates larger than the operating data rate among the plurality of transmit and receive modules are disabled by the power saving module.

17. A wireless network, wherein there are an IEEE 802.11b and an IEEE 802.11g standards suitable for the wireless network, the wireless network comprising:

an access point;

a 802.11b station, communicating according to the IEEE 802.11b standard; and a 802.11g station, communicating according to the IEEE 802.11g standard, having a DSSS baseband transceiver and an OFDM baseband transceiver for respectively communicating packets according to the IEEE 802.11b and the IEEE 802.11g standards, restraining itself from sending a CTS to self command to the 802.11b station before communicating with the access point to save network communication bandwidth if the access point is an 802.11g access point, wherein the 802.11g station stores a communication mode representing whether the 802.11g station communicates according to the IEEE 802.11b or the IEEE 802.11g standards, disables the OFDM baseband transceiver of the 802.11g station if the communication mode is the IEEE 802.11b standard, modulates a plurality of first packets of the 802.11g station with the DSSS baseband transceiver according to the IEEE 802.11b standard before the plurality of first packets is delivered by the 802.11g station, and demodulates a plurality of second packets of the 802.11g station with the DSSS baseband transceiver according to the IEEE 802.11b standard after the plurality of second packets is received by the 802.11g station.

18. The wireless network as claimed in claim 17, wherein the access point is restrained from sending a request to send (RTS) command to the 802.11b station before communicating with the 802.11g station to save network communication bandwidth if the access point is an 802.11g access point.

* * * * *

UNITED STATES PATENT AND TRADEMARK OFFICE
CERTIFICATE OF CORRECTION

PATENT NO.       : 7,599,325 B2                                          Page 1 of 1
APPLICATION NO.  : 11/371569
DATED            : October 6, 2009
INVENTOR(S)      : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 845 days.

Signed and Sealed this

Fourteenth Day of December, 2010

David J. Kappos
*Director of the United States Patent and Trademark Office*